United States Patent [19]
Frizot

[11] Patent Number: 5,178,045
[45] Date of Patent: Jan. 12, 1993

[54] ADAPTOR FOR SCREWING OR UNSCREWING A THREAD CONNECTING ELEMENT

[75] Inventor: Alain Frizot, Montcenis, France
[73] Assignee: Framatome, Courveboie, France
[21] Appl. No.: 718,602
[22] Filed: Jun. 20, 1991
[30] Foreign Application Priority Data
   Jun. 20, 1990 [FR] France ................ 90 07728
[51] Int. Cl.⁵ .................................... B25B 21/00
[52] U.S. Cl. ......................... 81/54; 81/57.14; 81/57.24
[58] Field of Search ................... 81/54–57, 81/57.11, 57.14, 57.3, 57.24, 57.42

[56] References Cited
FOREIGN PATENT DOCUMENTS
0166587 1/1986 European Pat. Off. .
0373022 6/1990 European Pat. Off. .

Primary Examiner—D. S. Meislin
Attorney, Agent, or Firm—Pollock, Vande Sande & Priddy

[57] ABSTRACT

The adaptor for screwing or unscrewing a thread connecting element (2), comprising a body (10) joined, at its upper end, to a unit (1) for driving the body (10) in rotational and translational movement comprises an arrangement for centering the body (10) on the threaded connecting element (2), an interconnection between the body (10) and the threaded connecting element (2) in terms of rotational and translational movement, means for temporarily interconnecting in terms of rotational movement the means for connecting in terms of translational movement and the body (10), and a hydraulic distributor (18) mounted on the body (10).

12 Claims, 4 Drawing Sheets

FIG_2

FIG_3

ADAPTOR FOR SCREWING OR UNSCREWING A THREAD CONNECTING ELEMENT

FIELD OF THE INVENTION

The present invention relates to an adaptor for screwing or unscrewing a threaded connecting element placed between the facing ends of an automatic screwing or unscrewing member and the threaded connecting element.

BACKGROUND OF THE INVENTION

In order to screw or unscrew threaded connecting elements, and more particularly large-size connecting elements consisting, for example, of bolts, automatic means are used, such as screwing and unscrewing robots.

The bolts are generally provided with a special connector which may be locked directly onto the nose of the screwing, or unscrewing robot.

In certain cases, the bolts do not have this special connector, with the result that it is necessary to insert an adaptor between the robot and the upper end of the bolt.

This is the case in particular for nuclear-reactor vessel bolts which are of the short type and do not have the special connector for interconnecting the robot and the bolt.

This adaptor serves to transmit the torque for the screwing or unscrewing to the bolts, but also to unlock the bolt from its position when difficulties are experienced in unscrewing it.

These difficulties may be the result, either of the threads being clogged up, or, of a mechanical stiff point. In the first case, it has been noted that, for effective action, the unscrewing torque must be greater than that initially provided.

This state of affairs gives rise, in the region of the connection joining the robot to the threaded connecting element, to supplementary and hence parasitic forces.

In the second case, the situation is particularly delicate. The origination of the mechanical stiff point may be caused either by the presence of an isolated hard body lodged between the threads or by creep caused by excessive clamping force or alternatively a force during use.

Whatever the type of anomalies to be eliminated, the adaptors used to date do not enable the problem to be solved effectively and generally require a fairly long service time, which may be prejudicial to the safety of the people responsible for these operations as they may be carried out in an area often made dangerous by the fact that it is subjected to high levels of radiation or to chemical pollution.

SUMMARY OF THE INVENTION

It is an object of the present invention to provide an automatic adaptor for screwing or unscrewing threaded connecting elements avoiding the abovementioned disadvantages and permitting, by virtue of its design, very rapid positioning beneath the nose of the screwing or unscrewing robot, while at the same time offering the possibility of transmitting vertical vibrations in order to unlock the threaded connecting element without dismantling the assembly thus formed between the robot and the threaded connecting element.

According to the invention, the adaptor for screwing or unscrewing a threaded connecting element comprising a body joined, at its upper end, to a unit for driving the body in rotational and translational movement comprises:

means for centering the body on the threaded connecting element;

means for interconnecting the body and the threaded connecting element in terms of rotational movement;

means for interconnecting the body and the threaded connecting element in terms of translational movement;

means for temporarily interconnecting in terms of rotational movement the means for connecting in terms of translational movement and the body, and and a hydraulic distributor mounted on the said body.

According to other features of the invention:

the centering means are formed by a connector intended to penetrate into a complementary socket arranged in the upper part of the threaded connecting element, the connector is carried by a piston which can be displaced along the axis of the body and is returned by a spring, the piston being housed in a bush forming the cylinder of a jack and fixed to the lower end of the body, the jack is supplied with pressurized fluid by a duct arranged in the body and joined to the hydraulic distributor, the means for interconnecting the body and the threaded connecting element in terms of rotational movement comprise a removable bush suspended elastically from the lower end of the body and integral in rotation with the latter by means of at least one driving finger, the removable bush comprises at least two inner flat surfaces intended to interact with at least two corresponding flat surfaces of the threaded connecting element, the means for interconnecting the body and the threaded connecting element in terms of translational movement comprise a screwing cover supported and mounted so as to be free in rotation on the body and driven in rotation by a collar which is itself driven by a motor carried by the body, the screwing cover comprises, at its base, an internal screw thread compatible with the upper external screw thread of the threaded connecting element, the collar is provided with an inner toothing interacting with a pinion driven in rotation by the motor, the means for temporarily interconnecting in terms of rotational movement the means for connecting in terms of translational movement and the said body comprise a member for locking the said screwing cover in rotation on the said body, the locking member is formed by a pin which can be displaced in a direction perpendicular to the axis of the body and the free end of which interacts with recesses arranged in the screwing cover, the pin can be displaced under the action of the pressurized fluid simultaneously supplying the jack, the pin is returned by a spring.

BRIEF DESCRIPTION OF THE DRAWINGS

The invention will be better understood with the aid of the description which follows, given purely by way of example and with reference to the attached drawings, in which.

DESCRIPTION OF PREFERRED EMBODIMENT

Figure 1:
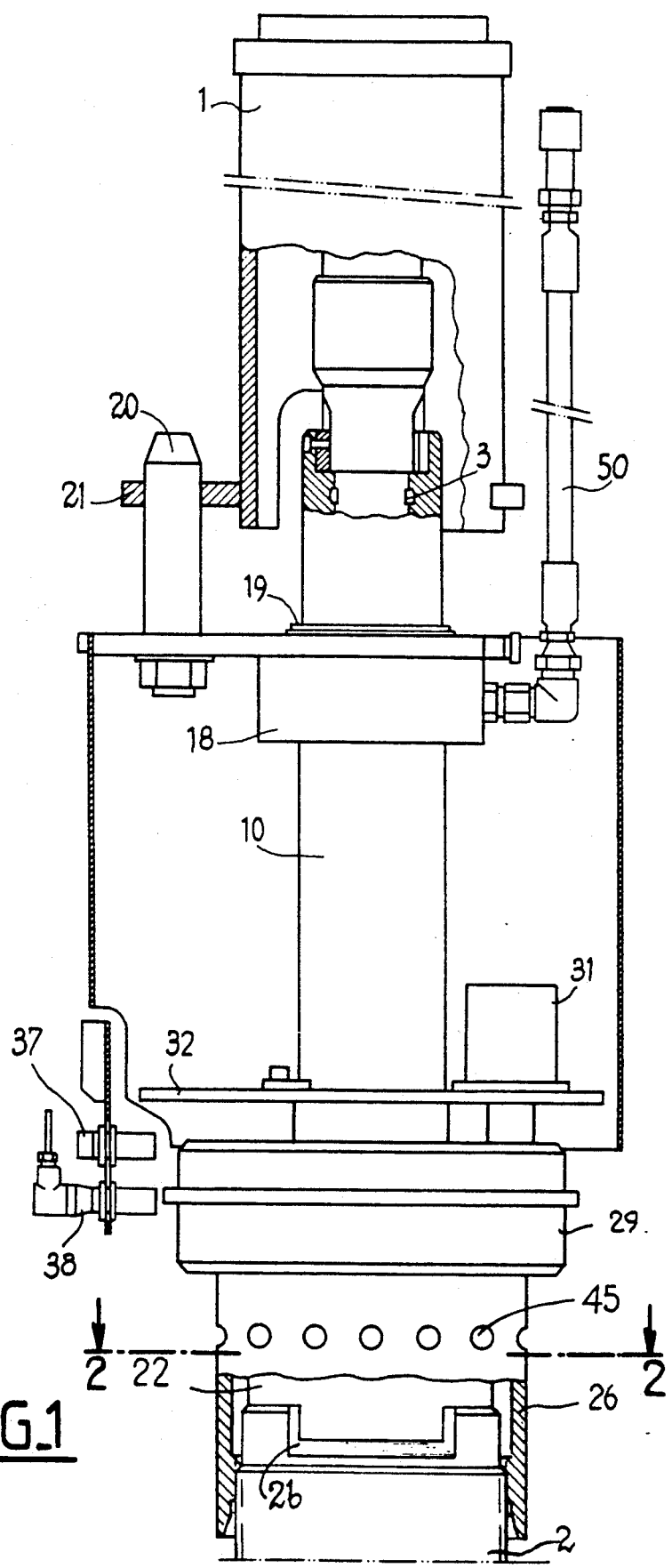
FIG. 1 is a schematic view in partial longitudinal section of the adaptor according to the invention.

The adaptor according to the invention, as shown in the drawings, is used in order to interconnect an automatic screwing or unscrewing unit 1 and a threaded connecting element consisting, for example, of a bolt 2.

This adaptor consists of a central body 10 suspended from the screwing or unscrewing unit 1 and integral with the latter in rotation and in translation via an appropriate connecting member such as, for example, a ball lock 3.

In order to enable the bolt 2 to be screwed or unscrewed under the action of the unit 1, and for the said bolt to be unlocked, the body 10 of the adaptor is provided at its lower end with:

with means for centering the body 10 on the threaded connecting element 2, means for interconnecting body 10 and the threaded connecting element 2 in terms of rotational movement, means for interconnecting the said body 10 and the threaded connecting element 2 in terms of translational movement, and means for temporarily interconnecting in terms of rotational movement the means for connecting in terms of translational movement and the body 10.

Figure 2:
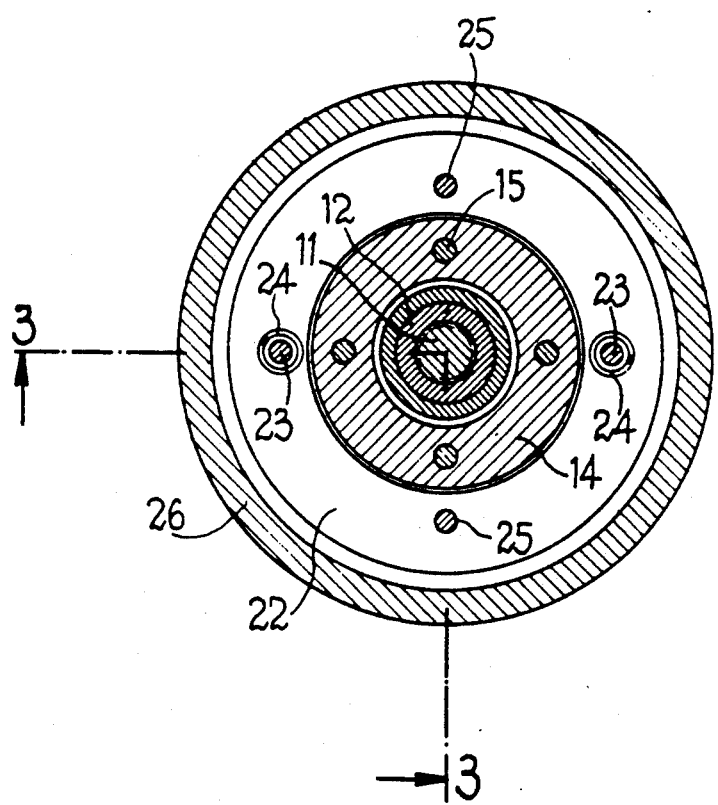
FIG. 2 is a view in cross-section along the line 2—2 in FIG. 1.
Figure 3:
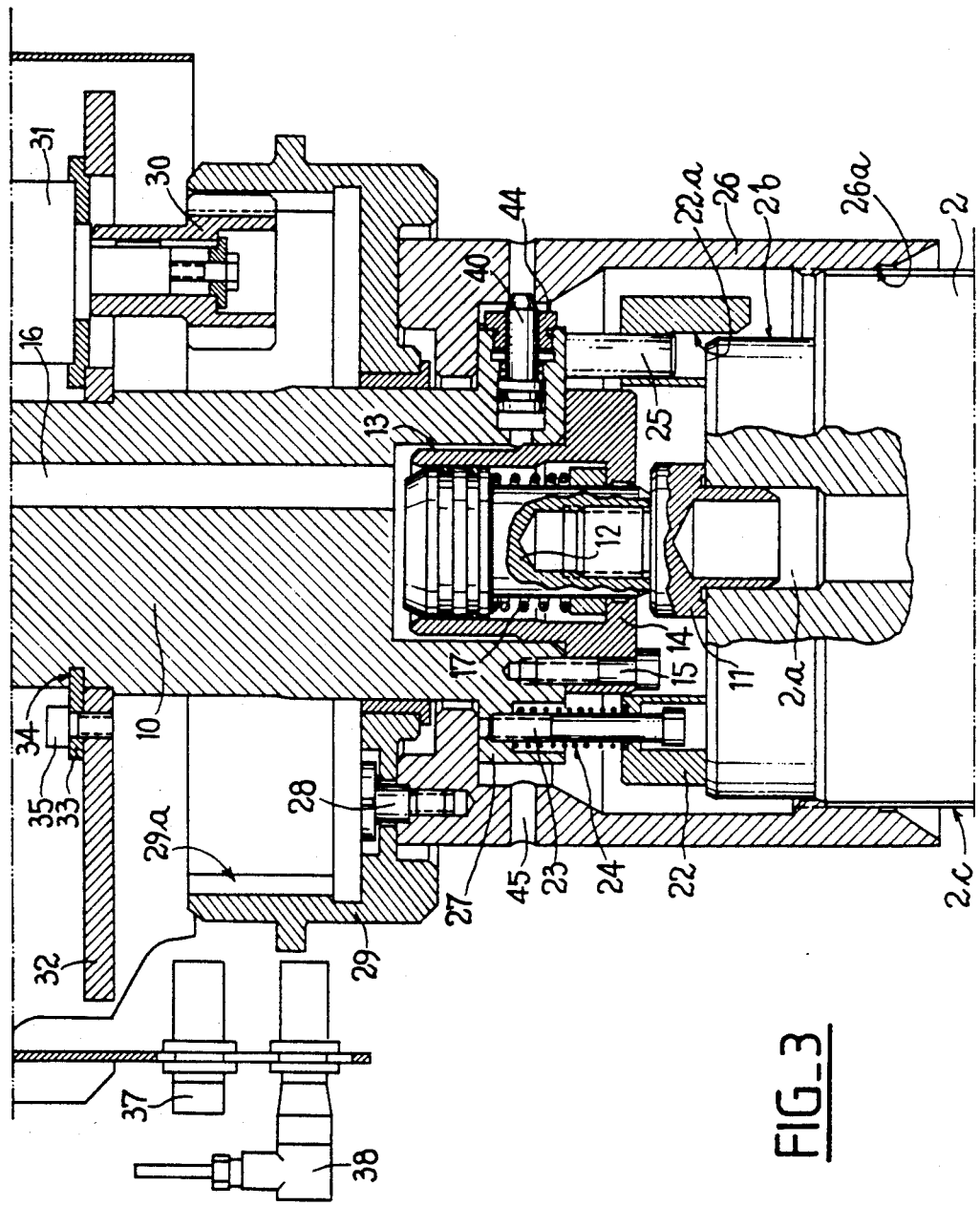
FIG. 3 is a view on a larger scale of the lower end of the adaptor and in cross-section along the line 3—3 in FIG. 2.

The means for centering the body 10 on the bolt 2 (FIGS. 2 and 3) comprise a connector 11 intended to penetrate into a socket 2a with a complementary shape and arranged in the upper part of the said bolt. This connector 11 is carried by a piston 12 of a single-acting jack 13.

The jack 13 comprises a cylinder formed by a bush 14 fixed to the lower end of the body 10 by screws 15.

This jack 13 is supplied with pressurized fluid by a duct 16 arranged in the body 10 of the adaptor such that the piston 12 is displaced along the axis of the body 10. The piston 12 is returned by a spring 17.

The duct 16 is coupled, opposite the jack 13, to a hydraulic distributor consisting of a rotary coupling housing 18 free in rotation on the body 10 but braced in terms of translational movement on the body by an elastic ring 19 (FIG. 1).

This housing 18 is held fixed in rotation by anti-rotation guide rods 20 which engage in respective eyes of a sleeve 21 integral with the screwing or unscrewing unit 1.

The means for interconnecting the body 10 and the bolt 2 in terms of rotational movement (FIG. 3) comprise a removable bush 22 suspended elastically beneath the body 10 by means of screws 23 and springs 24, each spring 24 being mounted around a screw 23 between the lower face of body 10 and the upper face of removable bush 22.

This removable bush 22 is driven in rotation by the body 10 with the aid of two fingers 25 (FIGS. 2 and 3) screwed into the latter.

The removable bush 22 furthermore comprises at least two inner flat surfaces 22a which interact with at least two corresponding flat surfaces 2b of the bolt 2 so as to drive the bolt in the manner of a spanner.

The means for interconnecting the body 10 of the adaptor and the bolt 2 in terms of translational movement comprise a screwing cover 26 supported by a shoulder 27 provided at the lower end of body 10.

The screwing cover 26, mounted so as to be free in rotation on the body 10, comprises, at its base, an internal screw thread 26a compatible with the upper external screw thread 2c of the bolt 2.

This screwing cover 26 is moreover driven in rotation by means of screws 28 by a collar 29 provided with inner teeth 29a interacting with a pinion 30 driven by a motor 31, for example a hydraulic motor.

The motor 31 is fixed on a support plate 32 which is locked in rotation on the body 10 by blocks 33 clamping the said body 10 against corresponding flat surfaces 34. These blocks 33 are fixed to the support plate 32 by locking screws 35.

The displacements of the collar 29 are controlled by an upper proximity sensor 37 and a lower proximity sensor 38.

The adaptor also comprises means for temporarily interconnecting in terms of rotational movement the means 26, 28, 29 and 30 for connecting in terms of translational movement and body 10.

This connection is made by making the body 10 of the adaptor and the screwing cover 26 temporarily integral in rotation.

Figure 4:
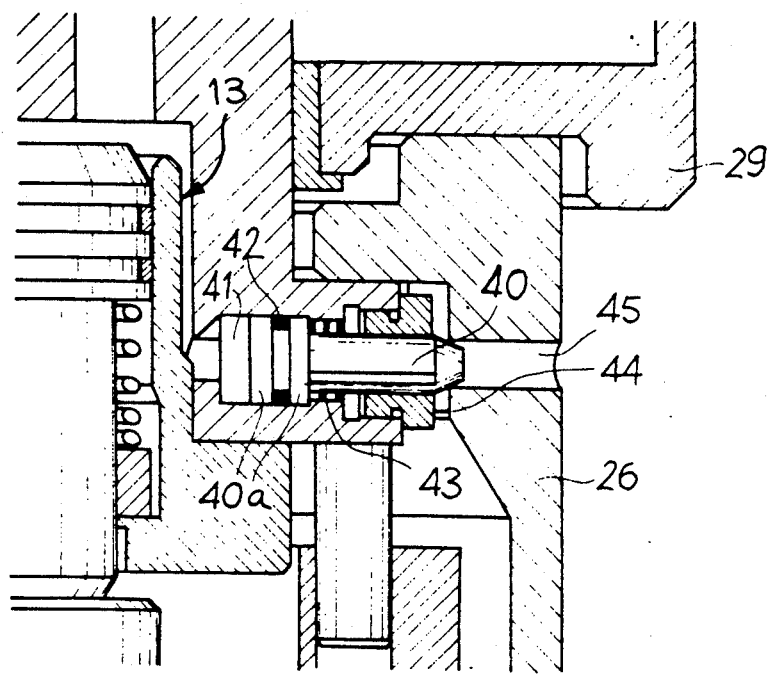
FIG. 4 is a view in cross-section and on a larger scale of the means for temporarily interconnecting the screwing cover and the body of the adaptor in terms of rotational movement.

To this end, the body 10 comprises, at its lower end, in the shoulder 27, a pin 40 which can be displaced in a direction perpendicular to the axis of body 10 (FIG. 4).

This pin 40 is mounted in a chamber 41 arranged in the shoulder 27 communicating with the chamber of the jack 13. The pin 40 has two ribs 40a between which is placed a seal 42 and is returned by a spring 43 arranged between one of the ribs 40a and a stop collar 44.

The free end of the pin 40 interacts with recesses 45 provided all around the cover 26 so as to prevent the cover from being unscrewed instead of the bolt 2 when the vibrations are transmitted.

The hydraulic distributor 18 is joined by a flexible tube 50 (FIG. 1) to a device for supplying pressurized fluid (not shown).

The adaptor functions as follows.

The screwing or unscrewing unit 1 is first equipped with the adaptor by making these two elements integral in terms of rotational and translational movement via the ball lock 3.

The operator then controls the lowering of the unit 1 and of the adaptor until the bush 22 of the body 10 bears against the upper face of the bolt 2, the springs 24 being partially compressed.

The cover 26 then rests on the first thread of the bolt 2 and the connector 11 of the piston 12 penetrates into the socket 2a of the bolt so as to center the body 10 of the adaptor on bolt 2 before screwing on the cover 26.

The operator controls the slow rotation of the body 10 via the screwing or unscrewing unit 1. As soon as the flat surfaces 22a of the bush 22 arrive opposite the flat surfaces 2b of the bolt 2, the bush drops and thus locks the body 10 and the bolt 2 in rotation.

Following this locking, the operator controls the rotation of the hydraulic motor 31 which, via the pinion 30 and the collar 29, drives the cover 26. This cover 26, which is not perfectly centered on the body 10, given the play in the region of the screws 28, is self-centered on the thread of the bolt 2 and begins to be screwed on.

The order to stop the screwing on of the cover 26 is given by the lower proximity sensor 38 situated opposite the collar 29.

The pressurized fluid then supplies, through the flexible tube 50, the hydraulic distributor 18 and the duct 16, and simultaneously the chamber of the jack 13 and the chamber 41.

The piston 12 is displaced along the axis of the body 10 and exerts a pressure via the connector 11 on the upper face of the bolt 2 and thus takes up the play in the internal screw thread 26a of the cover 26 when the latter is screwed onto the bolt 2.

The adaptor is now operational for the normal functions of the screwing or unscrewing unit 1 which are thus the screwing or unscrewing of the bolt 2 while continually trying to find the optimum torque.

Indeed, the screwing or unscrewing unit 1 is integral with the bolt 2, on the one hand in rotation via the body 10 and the sleeve 22, and on the other hand in terms of translational movement via the body 10 and the screwing cover 26.

In the case where a bolt refuses to unscrew under the action of the normal unscrewing torque, recourse is had to applying vertical vibrations to the bolt.

Two situations may occur; either the pin 40 is already engaged in a recess 45 such that the cover 26 cannot be unscrewed from the bolt 2, or pin 40 is not engaged in a recess 45.

Under the action of the vibrations emitted by the screwing or unscrewing unit 1 and transmitted by the body 10, which are added to the force of the piston 12, the cover 26 unscrews until the pin 40 drops into the first available recess 45.

The cover 26 is then fixed in rotation with the body 10, and the vertical vibrations are then transmitted as far as the base of the bolt 2, which facilitates its extraction and does so without unscrewing the cover 26, in other words without dismantling the assembly between the cover and the bolt.

The above-described functions are all managed by a programmable robot (not shown), installed in the same control and command console as that of the screwing or unscrewing unit.

The adaptor according to the invention therefore permits the uninterrupted communication of vertical vibrations without any risk of loosening in the region of the screw threads of the coupling and, by virtue of its design, requires a very short servicing time for its fitting.

Moreover, and in particular in the case of short bolts used for example to fix the head onto a nuclear reactor vessel, it enables a rigid connection between the bolt and adaptor to be made, which means that the configuration of a long bolt is rapidly recreated.

I claim:

1. Adaptor for screwing or unscrewing a threaded connecting element (2), comprising a body (10) joined, at its upper end, to a unit (1) for driving said body (10) in both rotation and translation, wherein said adaptor comprises:

(a) means (11, 12) for centering said body (10) on said threaded connecting element (2);

(b) means (22, 23, 24, 25) for interconnecting said body (10) and said threaded connecting element (2) for joint rotational movement;

(c) means (26, 28, 29, 30) for interconnecting said body (10) and said threaded connecting element (2) for joint translational movement;

(d) means (40, 41, 45) for temporarily interconnecting for joint rotation said body (10) and said means (26, 28, 29, 30) for connecting for joint translational movement; and (e) a hydraulic distributor (18) mounted on said body (10).

2. Adaptor according to claim 1, wherein said centering means are formed by a connector (11) intended to penetrate into a complementary socket (2a) arranged in an upper part of said threaded connecting element (2).

3. Adaptor according to claim 2, wherein said connector (11) is carried by a piston (12) which can be displaced along an axis of said body (10) and is returned by a spring (17), said piston (12) being housed in a bush (14) forming a cylinder of a jack (13) and fixed to a lower end of said body (10).

4. Adaptor according to claim 3, wherein said jack (13) is supplied with pressurized fluid by a duct (16) arranged in said body (10) and joined to said hydraulic distributor (18).

5. Adaptor according to claim 1, wherein said means for interconnecting said body (10) and said threaded connecting element (2) for joint rotational movement comprise a removable bush (22) suspended elastically from said lower end of said body (10) and integral in rotation with said body by means of at least one driving finger (25).

6. Adaptor according to claim 5, wherein said removable bush (22) comprises at least two inner flat surfaces (22a) intended to interact with at least two corresponding flat surfaces (2b) of said threaded connecting element (2).

7. Adaptor according to claim 1, wherein said means for interconnecting said body (10) and said threaded connecting element (2) for joint translational movement comprise a screwing cover (26) supported and mounted so as to be free in rotation on said body (10) and driven in rotation by a collar (29) which is itself driven by a motor (31) carried by said body (10).

8. Adaptor according to claim 7, wherein said screwing cover (26) comprises, at its base, an internal screw thread (26a) compatible with an external screw thread (2c) of said threaded connecting element (2).

9. Adaptor according to claim 7, wherein said collar (29) is provided with an inner toothing (29a) interacting with a pinion (30) driven in rotation by said motor (31).

10. Adaptor according to claim 1, wherein said means (40, 41, 45) for temporarily interconnecting for joint rotational movement said body (10) and means (26, 28, 29, 30) for connecting for joint translational movement comprise a pin (40) which can be displaced in a direction perpendicular to said axis of said body (10) and which has a free end interacting with recesses (45) arranged in said screwing cover (26).

11. Adaptor according to claim 10, wherein said pin (40) is displaced by pressurized fluid simultaneously supplying said jack (13).

12. Adaptor according to claim 11, wherein said pin (40) is returned by a spring (43).

* * * * *